US009934879B2

(12) United States Patent
Peucker et al.

(10) Patent No.: US 9,934,879 B2
(45) Date of Patent: Apr. 3, 2018

(54) FUEL ROD SUPPORT INSERT FOR A NUCLEAR FUEL ASSEMBLY SPACER GRID, SPACER GRID AND NUCLEAR FUEL ASSEMBLY

(71) Applicant: AREVA NP, Courbevoie (FR)

(72) Inventors: Jörg Peucker, Erlangen (DE); Norbert Schmidt, Mistelgau (DE); Veit Marx, Erlangen (DE); Julien Desbois, Valence (FR)

(73) Assignee: AREVA NP, Courbevoie (FR)

(*) Notice: Subject to any disclaimer, the term of this patent is extended or adjusted under 35 U.S.C. 154(b) by 325 days.

(21) Appl. No.: 14/646,709

(22) PCT Filed: Nov. 28, 2013

(86) PCT No.: PCT/EP2013/075025
§ 371 (c)(1),
(2) Date: May 21, 2015

(87) PCT Pub. No.: WO2014/086661
PCT Pub. Date: Jun. 12, 2014

(65) Prior Publication Data
US 2015/0287481 A1    Oct. 8, 2015

(30) Foreign Application Priority Data
Dec. 4, 2012   (EP) .................................... 12306515

(51) Int. Cl.
*G21C 3/356*     (2006.01)
*G21C 3/322*     (2006.01)
(Continued)

(52) U.S. Cl.
CPC ............. *G21C 3/356* (2013.01); *G21C 3/322* (2013.01); *G21C 3/352* (2013.01); *G21C 3/3566* (2013.01);
(Continued)

(58) Field of Classification Search
CPC .......... G21C 3/30; G21C 3/32; G21C 3/3206; G21C 3/322; G21C 3/34;
(Continued)

(56) References Cited

U.S. PATENT DOCUMENTS 3,298,922 A  *  1/1967  Prince ................... G21C 3/324
                                                            376/441
4,190,494 A      2/1980  Olsson
(Continued)

FOREIGN PATENT DOCUMENTS

EP         0 750 318 A1    12/1996
JP         S59-116577 A     7/1984
(Continued)

OTHER PUBLICATIONS

Search Report for corresponding International Application PCT/EP2013/075025.

*Primary Examiner* — Sharon M Davis
(74) *Attorney, Agent, or Firm* — Davidson, Davidson & Kappel, LLC

(57) ABSTRACT

A fuel rod support insert for a nuclear fuel assembly spacer grid, a spacer grid and a nuclear fuel assembly are provided. The support insert is for a nuclear fuel assembly spacer grid comprising interlaced straps defining a lattice of cells for receiving fuel rods, the insert being adapted to be secured to the straps for extending in at least one cell. The insert extends along an axis intended to be parallel to that of a cell and comprises two axially spaced end portions for connecting the insert to the straps and at least one elongated blade-like spring extending axially between the end portions for supporting a fuel rod. The spring has a non-rectilinear cross-section in each plane perpendicular to the insert axis.

18 Claims, 12 Drawing Sheets

(51) Int. Cl.
*G21C 3/352* (2006.01)
*G21C 3/34* (2006.01)

(52) U.S. Cl.
CPC ...... *G21C 2003/3432* (2013.01); *Y02E 30/38* (2013.01)

(58) Field of Classification Search
CPC ...... G21C 2003/3432; G21C 2003/352; G21C 2003/356; G21C 2003/3566
See application file for complete search history.

(56) References Cited

U.S. PATENT DOCUMENTS

| | | |
|---|---|---|
| 4,314,884 A | 2/1982 | Fanning et al. |
| 4,772,447 A | 9/1988 | Manson et al. |
| 5,183,629 A | 2/1993 | Canat et al. |
| 7,792,236 B2 * | 9/2010 | Rozhkov ............ G21C 3/322 376/438 |
| 2009/0257546 A1 * | 10/2009 | Lu ...................... G21C 3/352 376/438 |
| 2011/0200160 A1 | 8/2011 | Evans et al. |

FOREIGN PATENT DOCUMENTS

| | | |
|---|---|---|
| JP | A05-323074 | 12/1993 |
| JP | A06-059090 | 3/1994 |
| JP | A2001-504935 | 4/2001 |
| JP | A2011-169899 | 9/2011 |

* cited by examiner

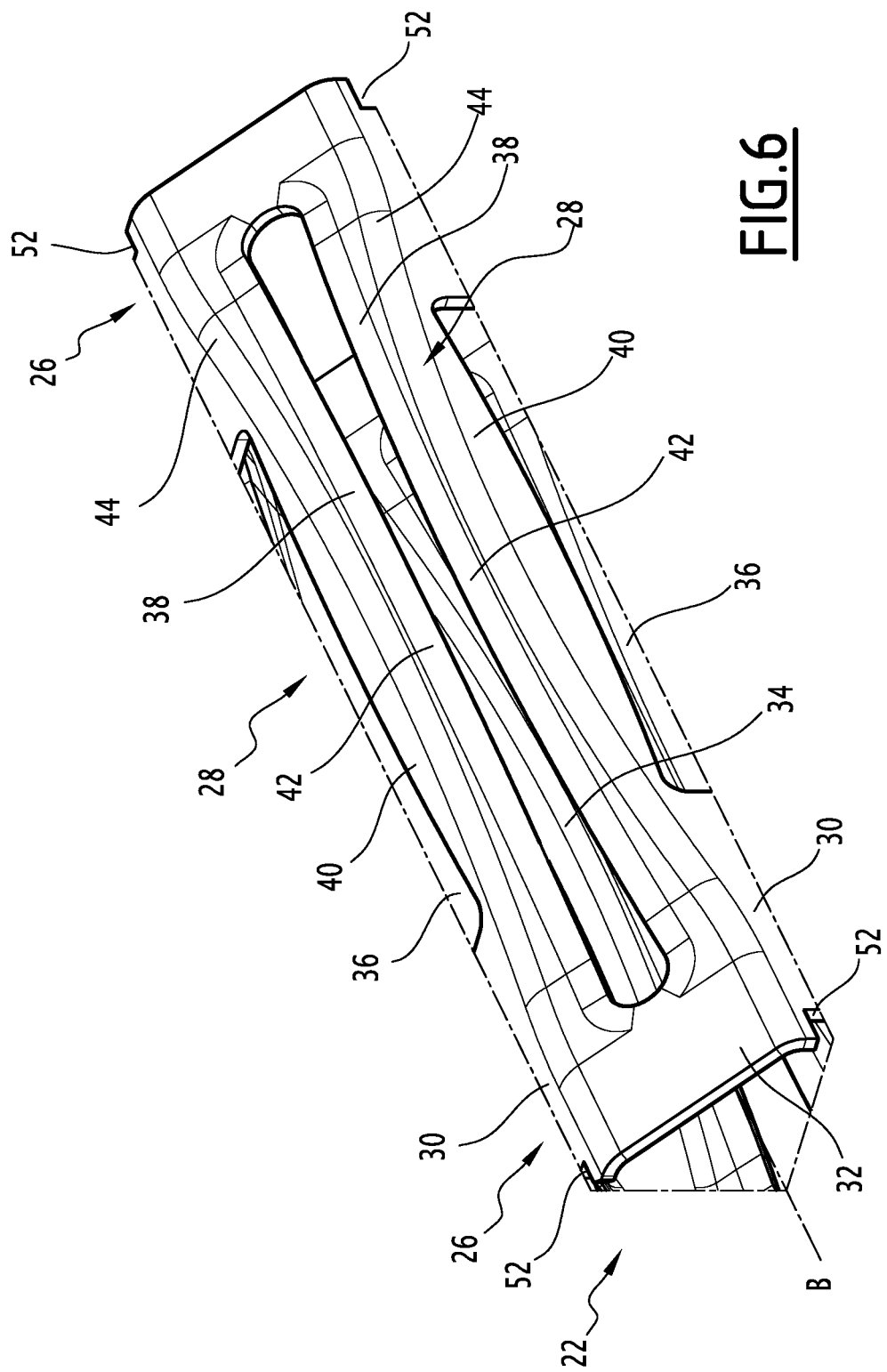

FUEL ROD SUPPORT INSERT FOR A NUCLEAR FUEL ASSEMBLY SPACER GRID, SPACER GRID AND NUCLEAR FUEL ASSEMBLY

The present invention relates to a fuel rod support insert for a nuclear fuel assembly spacer grid comprising interlaced straps defining a lattice of cells for receiving fuel rods, the insert being adapted to be secured to the straps for extending in at least one cell, the insert extending along an axis intended to be parallel to that of a cell and comprising two axially spaced end portions for connecting the insert to the straps and at least one elongated blade-like spring extending axially between the end portions for supporting a fuel rod.

BACKGROUND

EP 0 750 318 describes a fuel rod spacer grid comprising two superimposed sets of interlaced straps defining a lattice of cells for receiving fuel rods and inserts of the above-mentioned type, comprising end portions connected to the straps and leaf springs extending between the end portions with being separated by intermediate gaps.

SUMMARY OF THE INVENTION

An aim of the invention is to provide an insert enabling to better support fuel rods, namely with limiting risks of fretting at the contact between the insert and the fuel rods. Another aim of the invention is to enhance the buckling resistance of the spacer grid and to decrease its pressure drop.

To this end, an insert of the above-mentioned type is provided, wherein the spring has a non-rectilinear cross-section in each plane perpendicular to the insert axis.

In other embodiments, the insert comprises one or several of the following features, taken in isolation or in any technical feasible combination:
  the spring comprises two adjacent wings extending side-by-side along the insert axis and inclined one relative to the other, the wings including a contact wing for contacting the fuel rod and a lateral wing laterally extending the contact wing;
  the lateral wing is flat;
  the contact wing has a convex outer surface;
  the lateral wing is of varying width along the length of the spring;
  the contact wing is of substantially constant width;
  the contact wing is arched lengthwise;
  the insert comprises a pair of springs formed in one contact wall and two adjacent connection walls;
  the insert comprises at least two longitudinal walls inclined one relative to the other, the spring being formed at the junction between two walls with the contact wing formed in a contact wall and the lateral wing formed in an adjacent connection wall;
  the insert comprises a pair of springs having their contact wings formed in the same contact wall and each having its lateral wing formed in a respective connection wall adjacent the contact wall;
  the insert is tubular and comprises walls defining a polygonal cross-section, springs being located at the corners of the polygonal cross-section and each comprising two longitudinal wings formed in two adjacent walls;
  the insert comprises a pair of springs formed in the insert between three slots including one central slot longer than the two lateral slots;
  the central slot has a width decreasing from the axial ends of the central slot towards its middle.

The invention also relates to a spacer grid for a nuclear fuel assembly, comprising interlaced straps defining a lattice of cells for receiving fuel rods and support inserts provided at the intersections of the straps for supporting fuel rods extending through the cells as defined above.

In one embodiment, the connection walls of the insert are inserted in connection slots provided on lower edges of the interlaced straps.

In one embodiment, the insert is secured to the straps by spot-welds.

The invention further relates to a nuclear fuel assembly comprising a bundle of fuel rods and an armature for supporting the fuel rods, the armature comprising at least one spacer grid as defined above.

In one embodiment, the nuclear fuel assembly further comprises at least one intermediate mixing grid comprising interlaced straps provided with mixing vanes and defining a lattice of cells for receiving fuel rods and tubular inserts each provided around the intersection of two straps for preventing contact between the fuel rods extending through the cells and the mixing vanes. The inserts are for example secured to the straps by at least one spot weld.

BRIEF SUMMARY OF THE DRAWINGS

The invention and its advantages will be better understood on reading the following description given solely by way of example and with reference to the appended drawings, in which:
FIG. 6 is partial perspective view of the insert of FIG. 3.

DETAILED DESCRIPTION

Figure 1:
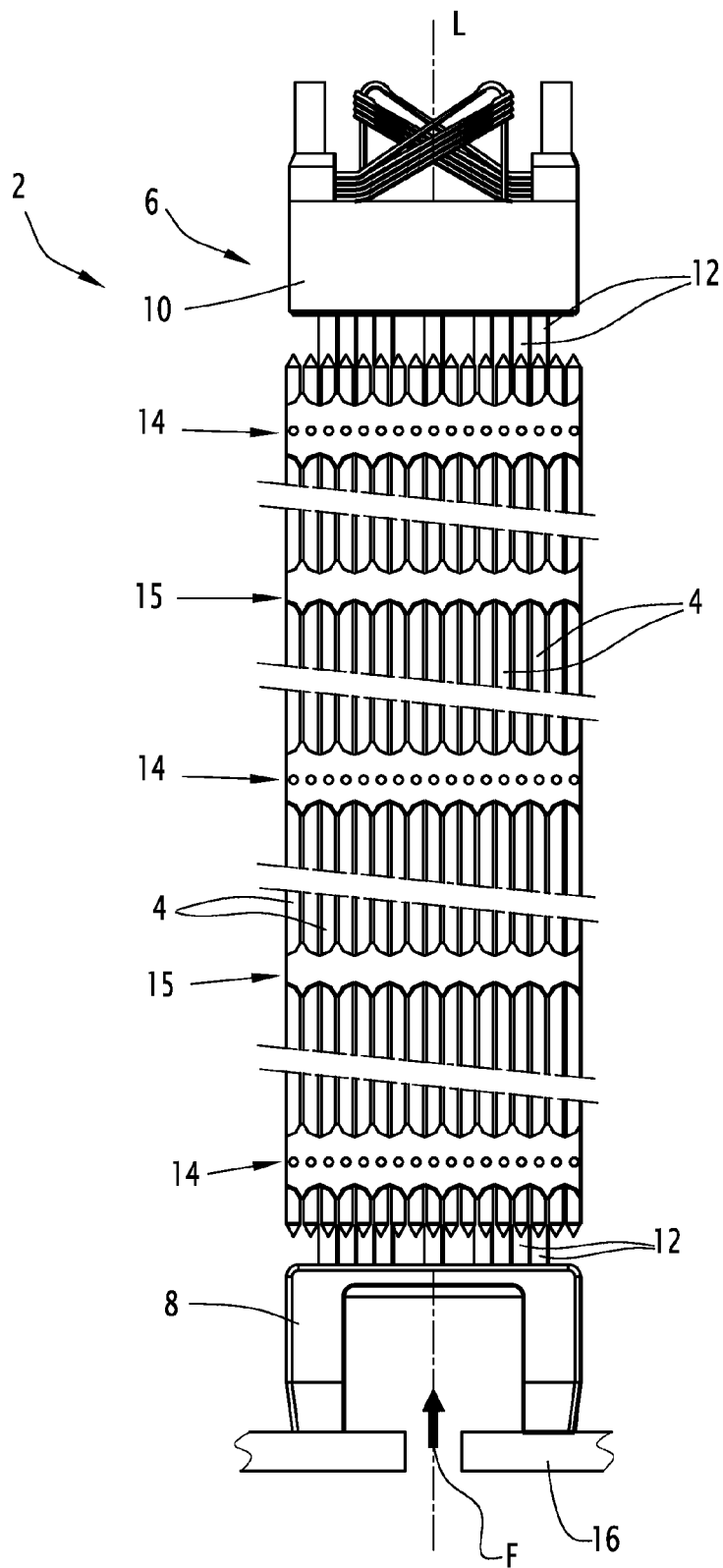
FIG. 1 is a schematic side elevation view of a nuclear fuel assembly according to an embodiment of the invention.

The nuclear fuel assembly 2 of FIG. 1 is adapted for use in a Pressurized Water Reactor (PWR). It comprises a bundle of nuclear fuel rods 4 and an armature 6 for supporting the fuel rods 4. The fuel assembly 2 is elongated along an assembly axis L.

The armature 6 comprises a lower nozzle 8, an upper nozzle 10, a plurality of guide thimbles 12 and a plurality of spacer grids 14.

The nozzles 8, 10 are spaced along the assembly axis L. The guide thimbles 12 extend parallel to assembly axis L and connect the lower nozzle 8 to the upper nozzle 10. Each guide thimble 12 opens upwards through the upper nozzle 10 for allowing insertion of a control rod into the guide thimble 12.

The spacer grids 14 are distributed along the guide thimbles 12 and may be secured to the guide thimbles 12 for instance by welding. Each spacer grid 14 extends transversely to the assembly axis L.

Optionally, as illustrated on FIG. 1, the fuel assembly 2 comprises one or several intermediate mixing grids 15 positioned along the fuel assembly 2. Each mixing grid 15 is positioned in the span between two successive spacer grids 14.

Each intermediate mixing grid 15 extends transversely to the assembly axis L and may be secured to the guide thimbles 12 for instance by welding. Each intermediate mixing grid 15 is provided to impart mixing movement to coolant flowing through the intermediate mixing grid 15 without supporting the fuel rods 4.

The fuel assembly 2 may comprise at least one span between two successive spacer grids 14 provided with at least one mixing grid 15 positioned in said at least one span and at least one span between two successive spacer grids 14 free of mixing grid 15.

The fuel assembly 2 may comprise at least one span between two successive spacer grids 14 provided with several mixing grids 15 positioned in the same said span, e.g. two mixing grids 15.

Each fuel rod 4 comprises a tubular cladding, pellets of nuclear fuel stacked inside the cladding and caps closing the ends of the cladding. Each fuel rod 4 extends parallel to assembly axis L through the spacer grids 14 and the intermediate mixing grids 15 if any, with being supported transversely and longitudinally relative to assembly axis L by the spacer grids 14.

In operation, the fuel assembly 2 is placed in the core of a nuclear reactor with the lower nozzle 8 resting on a bottom plate 16 of the core and the assembly axis L being substantially vertical. A coolant flows upwardly from an inlet of the bottom plate 16, between the fuel rods 4 and through the nozzles 8, 10, the spacer grids 14 and the intermediate mixing grids 15 as illustrated by arrow F on FIG. 1.

In the fuel assembly 2 represented on FIG. 1, the spacer grids 14 are similar to each other and one spacer grid 14 will be further described with reference to FIG. 2.

Figure 2:
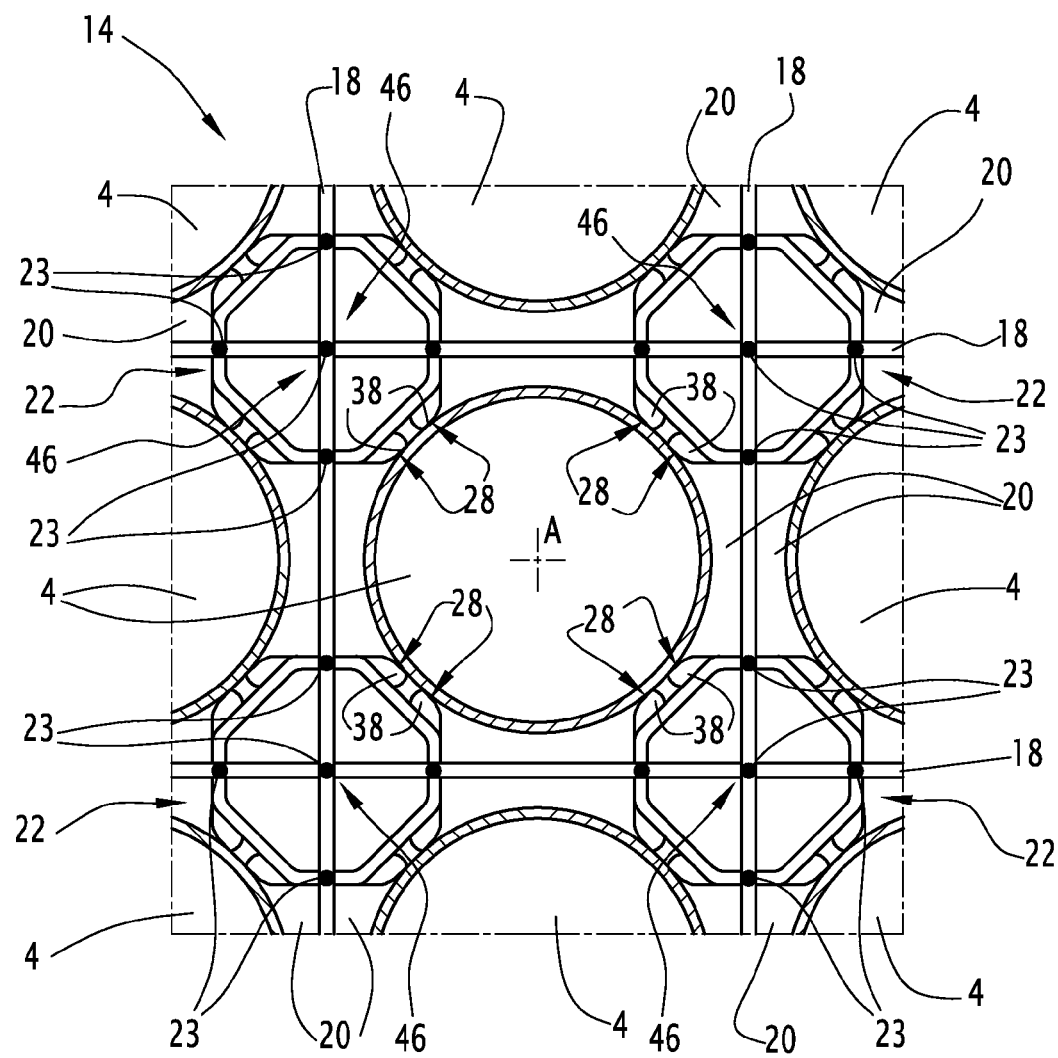
FIG. 2 is a partial bottom view of a spacer grid of the fuel assembly of FIG. 1.

As illustrated on FIG. 2, the spacer grid 14 comprises interlaced metal straps 18 defining a plurality of cells 20 for receiving fuel rods 4 and inserts 22 arranged at the intersection 46 of the straps 18 for supporting fuel rods 4 extending through the cells 20. The straps 18 are secured together for instance by spot welds 23 at the intersection 46 of the top edge and the bottom edge of intersected straps 18. The straps 18 intersect at right angle.

At least some of the spacer grids 14 of the fuel assembly 2 comprise also features such as mixing vanes to homogenise the flow of water and reduce the differences in temperature between the different points on the claddings by causing a transverse redistribution of the coolant water.

Each cell 20 extends along an axis A perpendicular to the plane of the spacer grid 14 (plane of FIG. 2). The axis A is substantially parallel to the assembly axis L. The fuel rods 4 extend through the cells 20 along the cell axis A. The cells 20 have square cross-section.

FIG. 2 shows a partial view of a nine cells square unit (3×3 cell unit) and four inserts 22 disposed at the intersections 46 of the four inner straps 18 delimiting the central cell 20 of the 3×3 cell unit. Only the central cell 20 and the corresponding fuel rod 4 are entirely visible on FIG. 2.

Each insert 22 is of tubular shape and extends around the intersection 46 of two straps 18 and in the adjacent corners of cells 20 of a four cells square unit (2×2 cell unit). Each insert 22 is adapted to support four fuel rods 4 extending through the cells 20 of the 2×2 cell unit.

The inserts 22 of FIG. 2 are similar and only one of them will be further described with reference to FIGS. 3-6.

As illustrated on FIGS. 3-6, the insert 22 extends along an insert axis B and has a tubular shape. FIG. 6 is a partial perspective view of the insert 22 showing a quarter of the insert 22.

Figure 4:
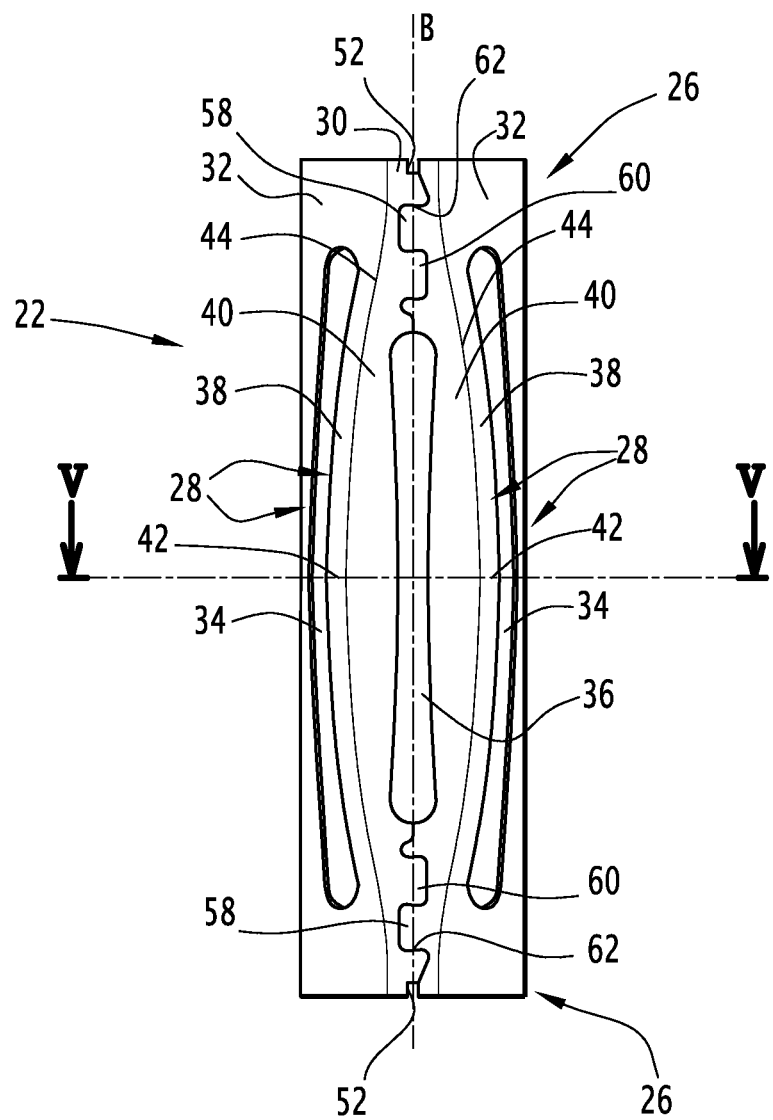
FIG. 4 is a side view of the insert from IV on FIG. 3.

As illustrated on FIG. 4, the insert 22 comprises two end portions 26 spaced along insert axis B and a plurality of elongated blade-like springs 28 extending along insert axis B between the end portions 26. The springs 28 are formed between longitudinal slots extending through the insert 22.

The end portions 26 have closed cross-sections in a plane transverse to the insert axis B.

Each spring 28 is connected at its axial ends to the end portions 26 and extends like a bridge between the end portions 26.

Figure 3:
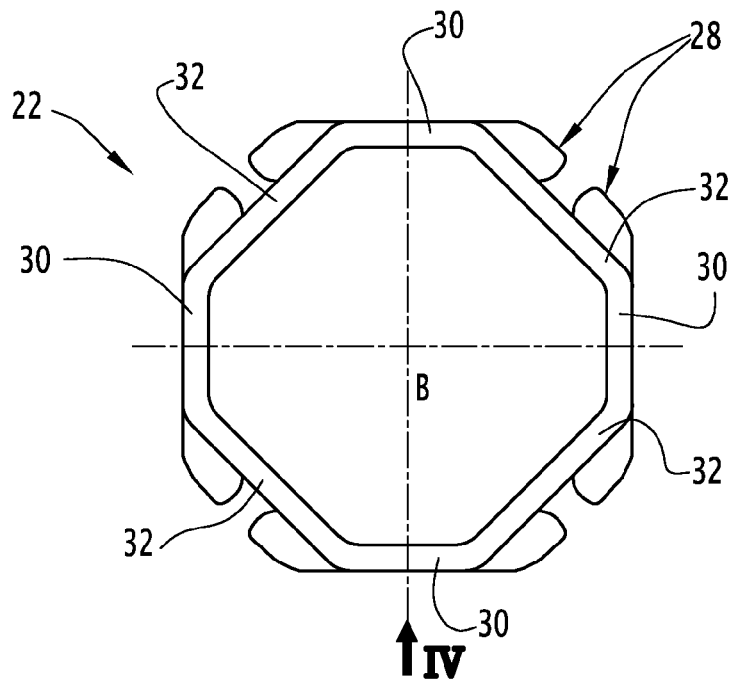
FIG. 3 is a top view of an insert of the spacer grid of FIG. 2.

As illustrated on FIG. 3, in view along the insert axis B, the insert 22 has an octagonal cross-section and comprises eight walls distributed around insert axis B, including connection walls 30 alternating with contact walls 32. The walls 30, 32 of each pair of adjacent walls 30, 32 are inclined at 45° one relative to the other.

Each connection wall 30 is adapted to intersect a strap 18 at 90° allowing connection of the insert 22 to the strap. The connection walls 30 are flat and parallel to the insert axis B.

Each contact wall 32 is adapted to extend obliquely at 45° in a corner formed by two intersecting straps 18 and to contact a fuel rod 4 received in a cell 20 delimited between the said two intersecting straps 18. Each contact wall 32 is arched radially outwardly in the axial direction B of the insert 22. The intermediate portion of each contact wall 32 protrudes outwardly with respect to the end portions of said contact wall 32 as is apparent on FIGS. 3 and 5.

Figure 5:
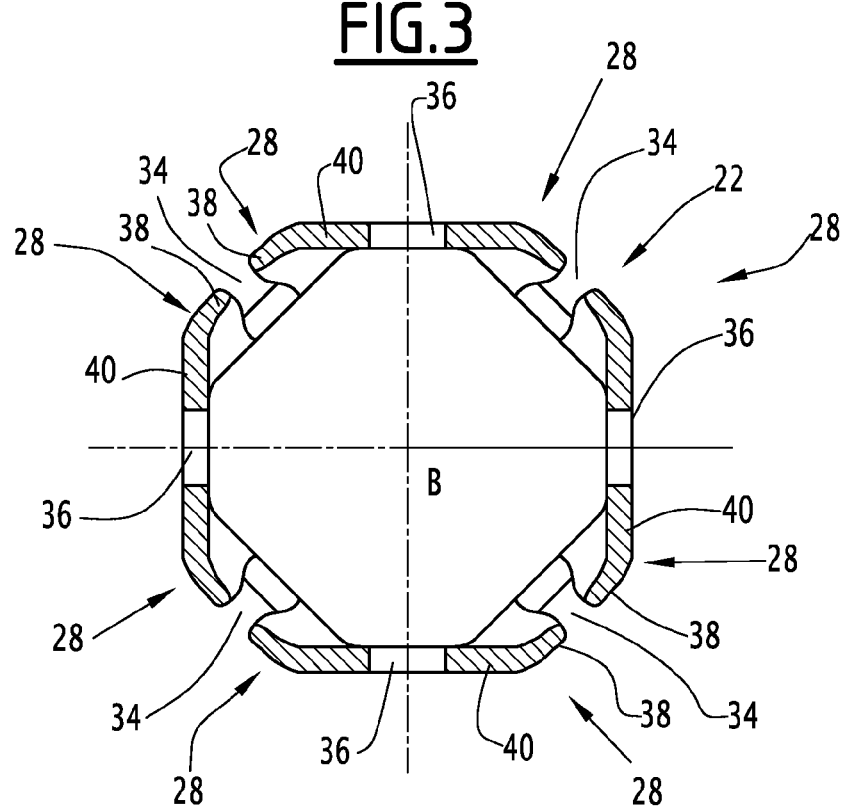
FIG. 5 is a cross-sectional view of the insert along V-V on FIG. 4.

As illustrated on FIGS. 4-6, the springs 28 are arranged in pairs, each pair being formed in the insert 22 between a central slot 34 formed in a contact wall 32 and two lateral slots 36 each formed in one of the two connection walls 30 adjacent the contact wall 32.

Each spring 28 is formed in the insert 22 at the junction of a connection wall 30 and an adjacent contact wall 32 between one central slot 34 formed in the contact wall 32 and one lateral slot 36 formed in the connection wall 30.

The central slot 34 is axially longer than the lateral slots 36 (FIGS. 4 and 6).

Each spring 28 comprises a longitudinal contact wing 38 formed in a contact wall 32 and a longitudinal lateral wing 40 formed in an adjacent connection wall 30. The contact wing 38 and the lateral wing 40 extend over the whole length of the spring 28 along the insert axis B and are inclined one relative to the other in a plane perpendicular to the insert axis B (FIG. 5).

Each spring 28 has a non-rectilinear cross-section in each plane perpendicular to insert axis B. In other words, the cross-section of each spring 28 taken in a plane perpendicular to insert axis B is non-rectilinear at each point of the spring 28 (FIG. 5).

More specifically in each plane the cross-section is arched with the concavity oriented inwardly towards the insert axis B providing a convex outer contact surface of the contact wing 38 on the fuel rod 4. The outer surface of the contact wing 38 is the surface of the contact wing 38 oriented opposite the insert axis B.

Each contact wing 38 is arched lengthwise. The contact wing 38 describes an arch in the lengthwise direction of the spring 28. The contact wing 38 has a lengthwise concavity oriented inwardly towards the insert axis B. The middle section of the contact wing 38 is at greater distance from insert axis B than the end sections of the contact wing 38. The spring 28 thus has an apex 42 protruding from the cross-section of the end portions 26.

Optionally, each contact wing 38 is arched transversely (FIG. 5). The transverse concavity of each contact wing 38 is directed radially inwardly.

Optionally, each contact wing 38 is also arched laterally towards the associated spring 28 of the pair of springs 28 in a front view of the contact wall 32 in a direction radial with respect to the insert axis B. The springs 28 of each pair are closer at their middle than at their axial ends. The width of the central slot 34 decreases from the axial end towards the middle of the central slot 34.

Each contact wing 38 is of substantially constant width along the length of the spring 28.

Each lateral wing 40 is flat and extends laterally from the corresponding contact wing 38 in the plane of the corresponding connection wall 30.

The width of the connection walls 30 increases from the end portions 26 towards the middle of the insert 22, while the width of the contact walls 32 correspondingly decreases (see FIGS. 4 and 5).

In the illustrated embodiment, each lateral slot 36 has a width decreasing from the end of the lateral slot 36 towards the center of the lateral slot 36. Each lateral slot has a smaller width in the center thereof. The free longitudinal edge of each lateral wing 40 (along the lateral slot 36) is curvilinear and curved away from the junction zone 44 between the lateral wing 40 and the contact wing 38. The junction zone 44 is also curved away from the free edge due to the curvatures of the contact wing 38.

Each lateral wing 40 has a width varying along the length of the spring 28. Each lateral wing 40 is larger at the center than at the ends.

Figure 7:
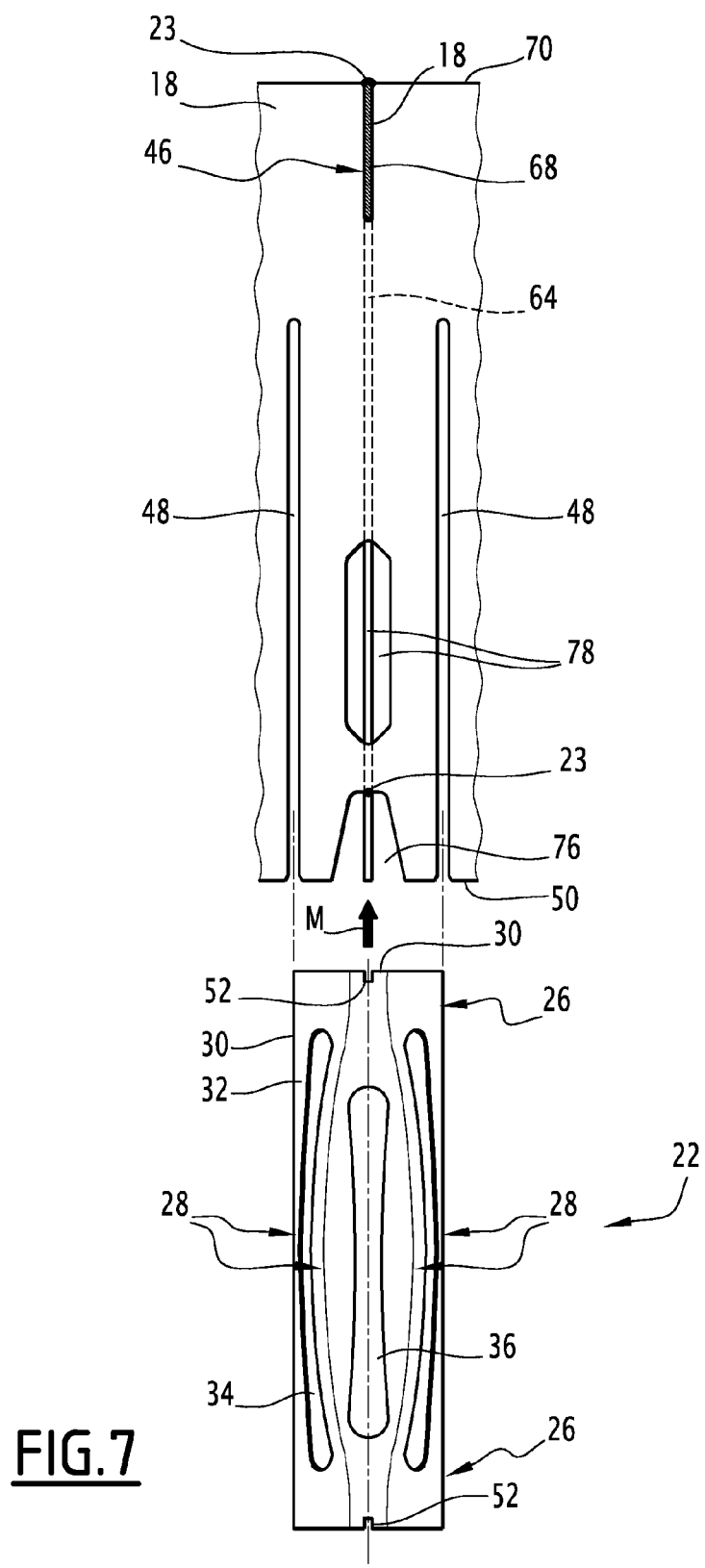
FIG. 7 is an exploded view of the insert and intersecting straps of the spacer grid of FIG. 2.

As illustrated on FIG. 7, the insert 22 is secured around an intersection 46 of two straps 18 by inserting the connection walls 30 of the insert 22 in connection slots 48 provided on the lower edges 50 of the intersecting straps 18 at a distance from the intersection 46, as illustrated by arrow M on FIG. 7. The straps 18 are interlocked by engaging interlocking slots 64, 68 provided in the lower edges 50 and upper edges 70 of the straps 18 at their intersection 46.

The insert axis B of the insert 22 secured around an intersection coincides with the intersection 46.

Each connection slot 48 extends upwardly from a lower edge 50 on a portion of the height of the strap 18.

The upper edge of each connection wall 30 of the insert 22 is provided with a notch 52 for fitting with the closed extremity of a connection slot 48 of a strap 18. The lower edge of each connection wall 30 of the insert 22 is axially secured to the corresponding straps 18 by mechanical means or preferably by a spot weld 23.

In a preferred embodiment, the lower edge of each connection wall 30 also has a notch 52. The insert 22 is in this way symmetrical about a plan which extends perpendicularly to the insert axis B and at mid-height of said insert 22. Each insert 22 can be loaded on the straps 18 by either end. The assembling of the insert 22 is thus easy, without any risk of inversion.

The use of the insert 22 leads to a very simple shape of the straps 18, flat in their interlaced part and very easy to assemble. In addition, the insert 22 being inserted from the lower edge 50 into the spacer grid 14, there is no risk of interference between the mixing devices possibly carried by the upper edge 70 of the straps 18 and the insert 22 during the spacer grid assembling. The mixing device may be designed without restriction due to the fuel rod support design.

After mounting, the lower edge of the insert 22 lies substantially in the plan defined by the lower edges 50 of the straps 18 of the spacer grid 14 in a preferred embodiment. In another embodiment, the insert 22 is also adjacent to the upper edge 70 of the spacer grid 14.

In use, as illustrated on FIG. 2, each fuel rod 4 is supported by four different inserts 22 each arranged in one of the corners of the cell 20 receiving the fuel rod 4. The insert axis B, the cell axis A and the fuel assembly axis L are substantially parallel. The fuel rod 4 is in contact with the contact wing 38 of each spring 28 of one pair of springs 28 of each insert 22.

The springs 28 bias the fuel rods 4 transversely to the cell axis A to support the fuel rod 4 transversely and longitudinally by friction relative to the spacer grid 14.

The springs 28 exhibit a 3D-shape that provides satisfactory support with reduced fretting risks.

The widthwise curved elongated springs 28 allow providing sufficient flexion stiffness for obtaining a linear contact between the fuel rod 4 and each spring 28 over a length sufficient for limiting local contact strain. The contact between the springs 28 of each pair of springs 28 and the fuel rod 4 must be sufficiently strong while avoiding fretting, namely when the fuel rod 4 vibrates in use due to the fluid flow of high velocity.

The lateral wing 40 inclined relative to the contact wing 38 imparts flexion stiffness to the spring 28. The flexion stiffness of the spring 28 and the deformation of the spring 28 under load namely depend upon the inclination between the wings 38, 40, and upon the width of the lateral wing 40 along the spring 28.

The lengthwise arched contact wing 38 ensures that the fuel rod 4 contacts the apex 42 of the contact wing 38 with a longitudinal linear contact increasing in length with the biasing force exerted by the spring 28 on the fuel rod 4 for distributing the force on a longer length and thus limiting local contact strain and fretting.

The converging laterally arched contact wings 38 of the springs 28 of each pair of springs 28 also ensures that a fuel rod 4 will contact the contact wings 38 in the region of their apexes 42.

The convex outer contact surface of the contact wing 38 allows contacting the fuel rod 4 with limited fretting risks.

The insert 22 of FIGS. 3-6 is tubular over its whole length since the springs 28 are formed at the junction between the walls 30, 32 of the insert 22, thereby keeping the tubular shape in the intermediate portion of the insert 22 between the end portions 26 and the overall stiffness of the insert 22.

The tubular end portions 26 of closed cross section allow rigidly securing the insert 22 to avoid dispersion of the efforts of the springs 28 and thereby ensure a good contact between the springs 28 and the fuel rod 4.

The insert 22 is obtainable e.g. by punching a tube or by rolling a metal sheet. In the preferred embodiment illustrated on FIG. 4, the insert 22 is obtained by providing an initially flat sheet punched with series of slots 34, 36 and locally curved to form the springs 28. The flat sheet is then rolled to define the tubular shape and the end portions 26 of its lateral edges are secured together for instance by spot welding or are preferably mechanically interlocked, for example by interlocking complementary dovetail-like teeth 58, 60 provided in opposed lateral edges of the sheet gathered upon rolling the sheet and defining a mortice-tenon joint as illustrated on FIG. 4. When inserted in the spacer grid 14, a joining line 62 of the two lateral edges of the sheet is positioned in a connection slot 48 of a strap 18 allowing lateral restrain of the lateral edges of the insert 22 avoiding further opening of the joining line 62.

The insert 22 has a compact design and is easy to manipulate since it has no or few asperities. This eases manufacturing and handling the insert 22.

Figure 8:
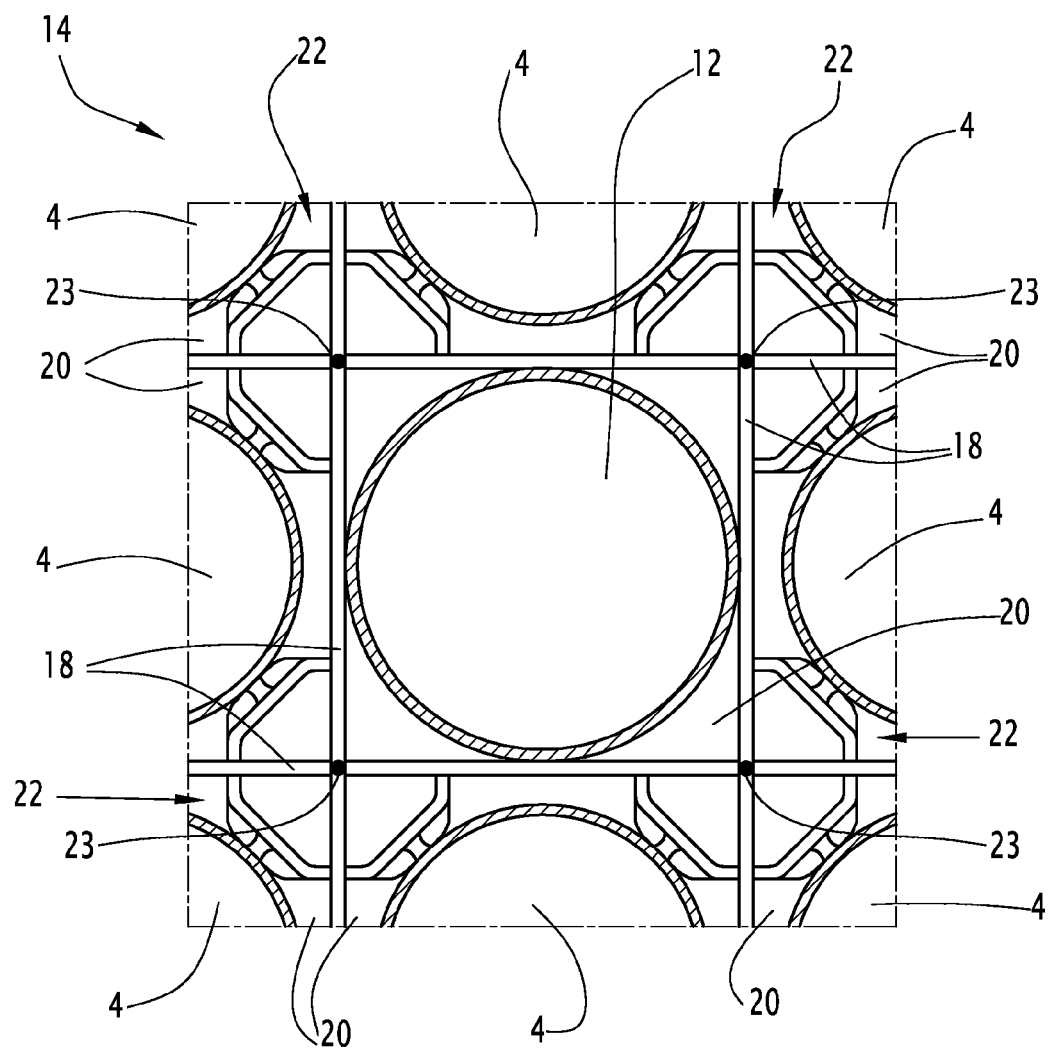
FIGS. 8 and 9 are partial top views illustrating other areas of the spacer grid of FIG. 2.

FIG. 8 illustrated a cell 20 receiving a guide thimble 12 instead of a fuel rod. The cell 20 receiving the guide thimble 12 is illustrated in the middle of a 3×3 cell unit with a partial view of the eight surrounding cells 20 each receiving one fuel rod 4.

The guide thimble 12 is in contact and secured (e.g. by welding) to the straps 18 delimiting the cell 20 receiving the guide thimble 12 and does not need to be supported by inserts 22.

Correspondingly, the insert 22 disposed at the intersecting straps 18 delimiting the cell 20 receiving the guide thimble 12 has an open cross-section extending on 270° around the insert axis B corresponding to three quarters of the insert 22 illustrated on FIGS. 3-6.

Figure 9:
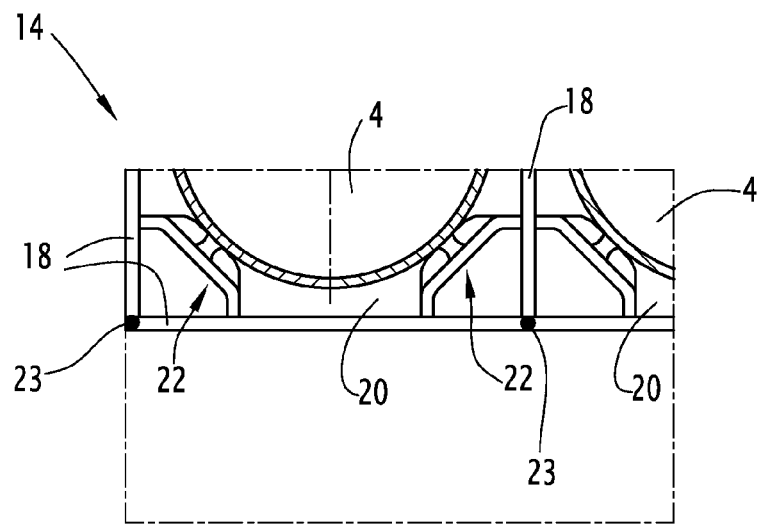

FIG. 9 illustrates peripheral cells 20 located at the periphery of the spacer grid 14 and receiving fuel rods 4.

An insert 22 of opened cross-section extending on 180° around the insert axis B and corresponding to half the insert 22 illustrated on FIGS. 3-6 is disposed to support fuel rods 4 in two adjacent cells 20.

An insert 22 of opened cross-section extending on 90° around the insert axis B and corresponding to a quarter of the insert illustrated on FIGS. 3-6 is disposed to support a fuel rod 4 in a cell 20 located in a corner of the spacer grid 14.

In an alternative embodiment, the external corner of each corner cell 20 of the spacer grid 14 is truncated and a wall inclined at about 45° relative to the peripheral straps 18 joins the adjacent peripheral straps 18 of the spacer grid 14. The fuel rod 4 located in the corner cell 20 is supported by a double dimple having a position and a shape similar to that of the pairs of springs 28 of an insert 22 and by three different inserts 22 each arranged in one of the other corners of the corner cell 20 receiving the fuel rod 4.

The inserts of opened cross-section (over 90°, 180° or 270°) enable to obtain a satisfactory support due to the inclined walls and to the curved springs formed at the junction between the walls. Once secured to the straps, the insert is strengthen and defines a tubular structure with the straps it is secured to.

To further optimize the contact area between the insert 22 and the fuel rod 4 and the vibratory behaviour of the fuel rod 4 under coolant flow during operation of the fuel assembly 2 in the nuclear reactor core, the size and the shape of the lateral slots 36 may be adapted.

Figures 10, 11:
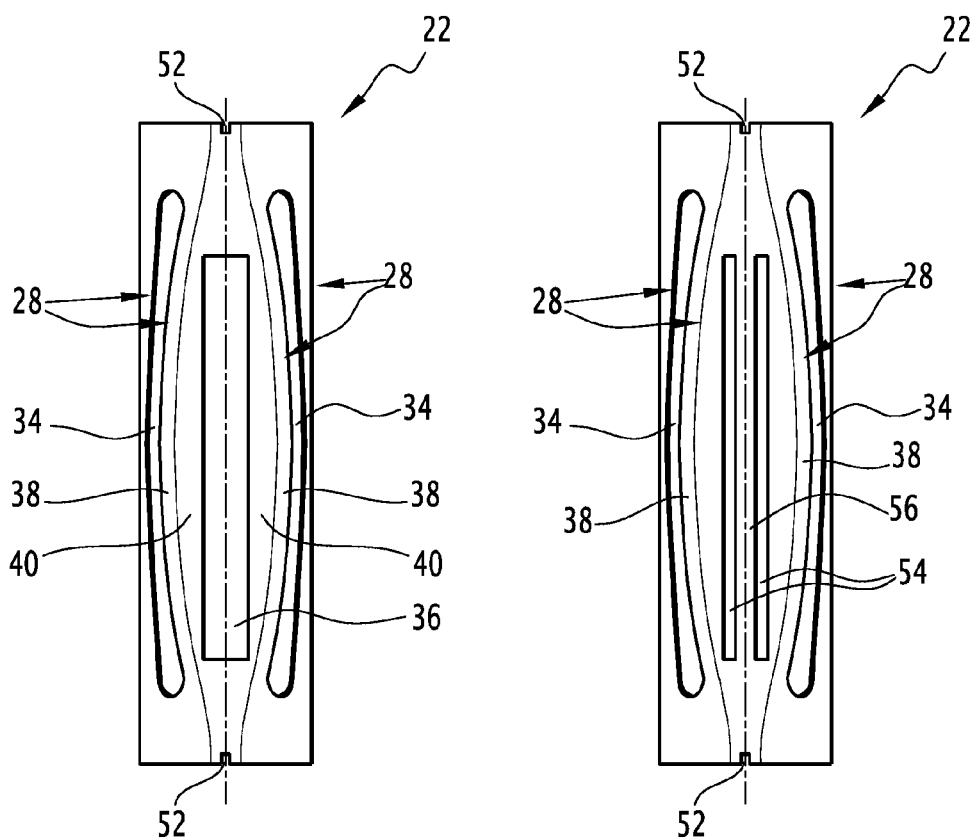
FIGS. 10 and 11 are side elevation views of alternative inserts according to other embodiments of the invention.

The insert 22 illustrated on FIG. 10 differs from that of FIGS. 3-6 by the feature that the lateral edges of the lateral slot 36 are rectilinear.

The insert 22 illustrated on FIG. 11 differs from that of FIGS. 3-6 by the feature that each single lateral slot 36 is replaced by two parallel longitudinal slots 54 separated by a flat blade 56. With such insert 22, the fuel rod 4 is even better maintained longitudinally in the cell 20 with a small increase of the pressure drop of the spacer grid 14 compared to the one lateral slot 36 embodiment.

Each insert 22 connects two interlaced straps 18 at a distance from the intersection 46 between the straps 18. The insert 22 reinforces the connection between the two straps 18.

Tests performed showed that a spacer grid 14 comprising inserts 22 spot-welded to the straps 18 has a superior mechanical strength and enhanced robustness regarding both fuel rod fretting and spacer grid buckling. The inserts 22 act as tighteners and increase the stability of the spacer grid 14 in case of lateral impact due for instance to seism or to Loss of Coolant Accident. Accordingly it is possible to further optimize the design of the strap 18 to convert this increased buckling resistance into thermal-hydraulic and neutronic performances.

Figure 12:
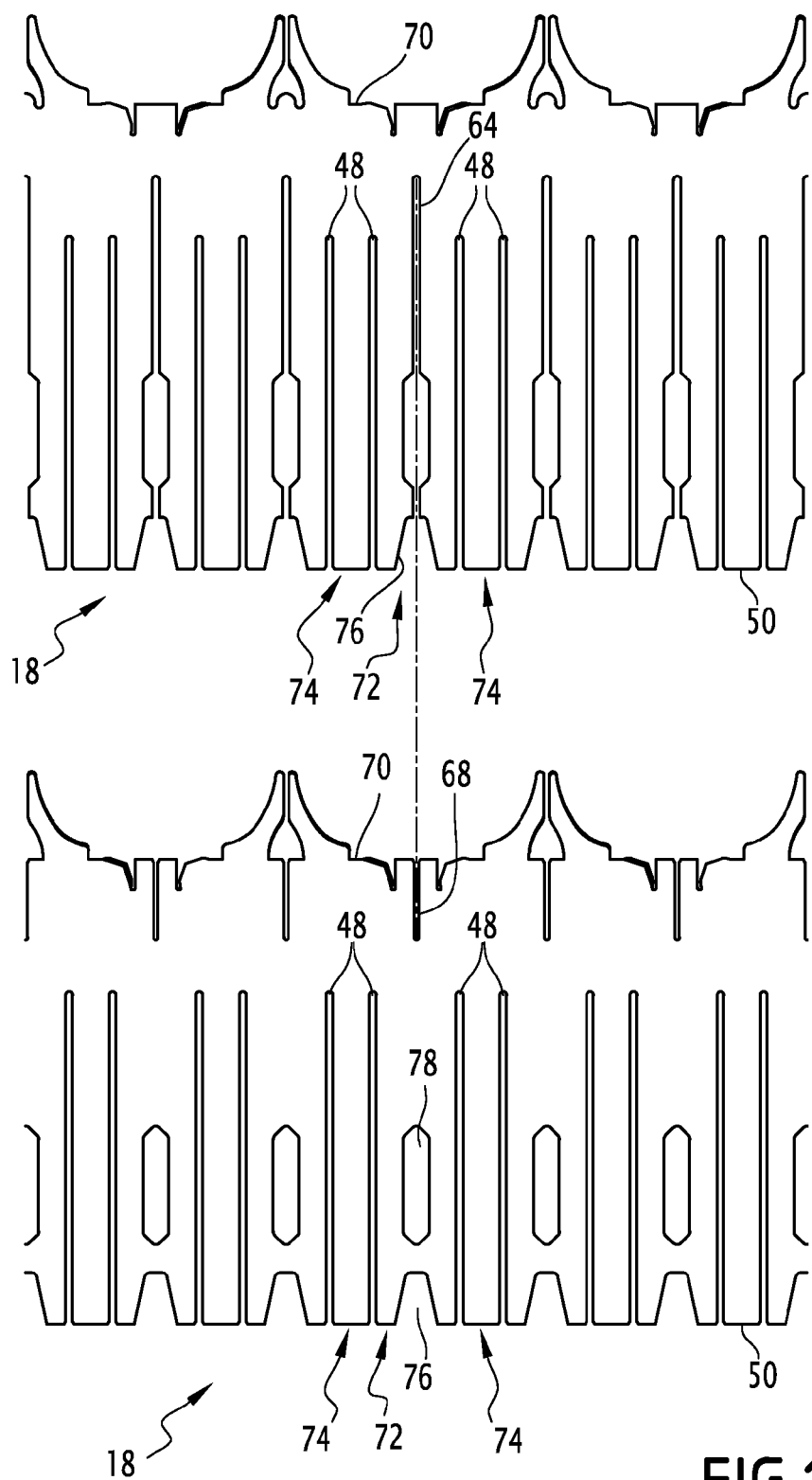
FIG. 12 is a front view of two straps to be interlaced for forming a spacer grid according to an embodiment of the invention.
Figure 13:
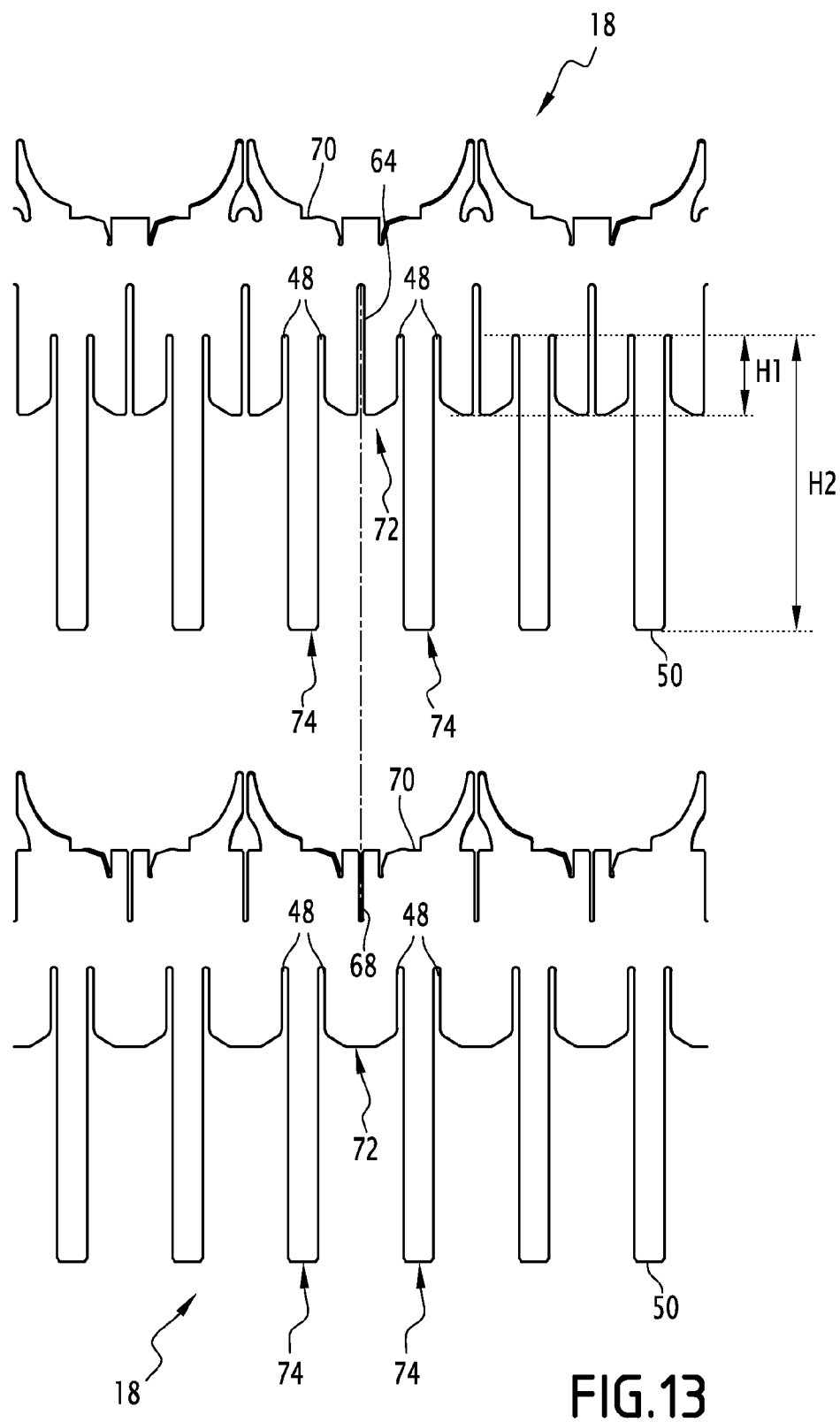
FIG. 13 is a front view of two straps to be interlaced for forming a spacer grid according to an embodiment of the invention.

FIGS. 12 and 13 each illustrate two straps 18 in front view, the two straps 18 being intended to intersect each other with receiving an insert around their intersection. For assembly, the straps are oriented at right angle one with respect to the other to interlock corresponding interlocking slits 64, 68 of the straps 18 as illustrated in phantom lines.

One strap 18 has a first interlocking slit 64 provided in a lower edge 50 and the other strap 18 has a corresponding second interlocking slit 68 provided in an upper edge 70. Each strap 18 has a pair of connection slots 48 on either side of the interlocking slits 64, 68 for receiving an insert.

Each strap 18 has intersection sections 72 each located between two adjacent connection slots 48 for receiving an insert alternating with intermediate sections 74 each located between to adjacent connection slots 48 for receiving two distinct inserts.

As illustrated on FIG. 6, the intersection section 72 of each strap 18 is provided on the lower end thereof with a lower cutout 76. The first interlocking slot 64 intersects the lower cutout 76 of the corresponding strap 18.

As illustrated on FIG. 7, the intersection section 72 of each strap 18 is provided with an intermediate cutout 78 at a distance from the lower edge 50 of the strap 18. The first interlocking slot 64 intersects the intermediate cutout 78 of the corresponding strap 18.

Upon interfitting the interlocking slits 64, 68, the lower cutouts 76 define a lower flow passage between the cells surrounding the intersection 46. In the same manner, the intermediate cutouts 78 define an intermediate flow passage between the cells around the intersection 46 of the straps 18.

In the embodiment of FIG. 13, the intersection sections 72 of each strap 18 are of lesser height than the intermediate sections 74 of the strap. A free gap is delimited between the free ends of each pair of adjacent intermediate sections 74. For example the height H1 of the portion of the intersection section 72 penetrating inside the insert is comprises between 0% and 90% of the height H2 of the insert which corresponds substantially to the distance between the lower edge 50 of a strap 18 and the closed end of the connection slots 48.

In one embodiment, the intersection section 72 ends before the insert 22 and does not penetrate into it.

These embodiments provide the advantage of limiting pressure drop and balancing pressure in the adjacent cells 20 separated by the straps 18. Limitation of pressure drop imparted by the strap 18 themselves allows both optimizing the shape and size of mixing vanes of the spacer grids 14 and of the intermediate mixing grids 15 optionally located between two adjacent spacer grids 14.

Preferably the design of the intermediate mixing grids 15 is consistent with the design of the spacer grid 14.

In the fuel assembly 2 represented on FIG. 1, the intermediate mixing grids 15 are similar to each other and one intermediate mixing grid 15 will be further described with reference to FIGS. 14-16.

Figure 14:
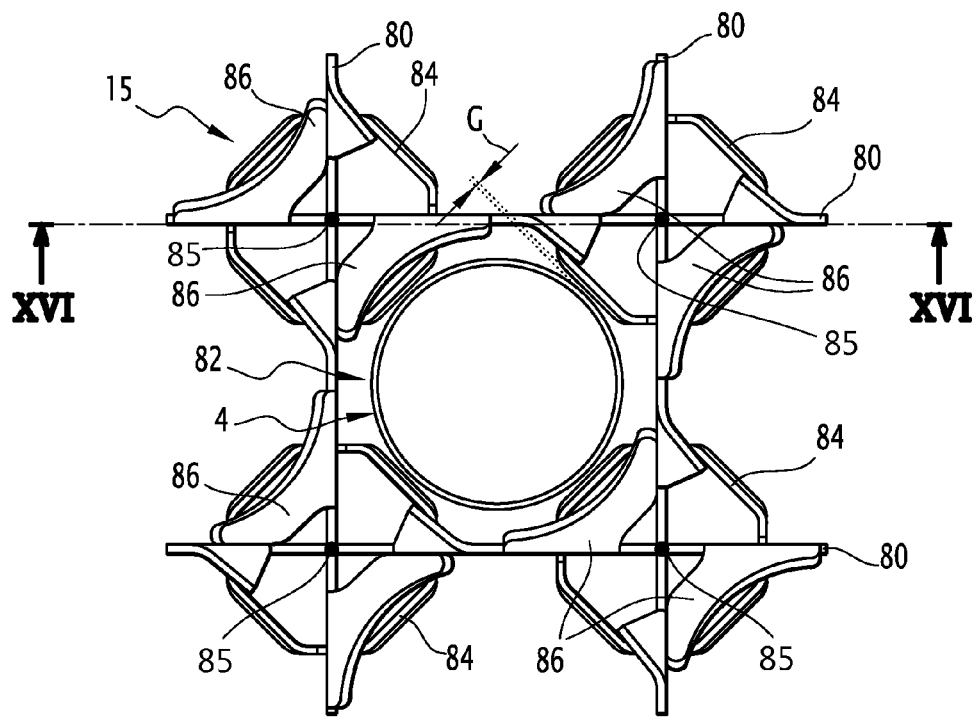
FIG. 14 is a partial top view an intermediate mixing grid having inserts.

As illustrated on FIG. 14, the intermediate mixing grid 15 comprises interlaced straps 80 defining cells 82 each for receiving a respective fuel rod 4 extending through the intermediate mixing grid 15. The straps 80 are secured together for instance by spot welds at the intersection of the top and/or lower edge of the intersected straps 80. The straps 80 intersect at right angle.

The intermediate mixing grid 15 is connected to the guide thimbles 12 extending through the intermediate mixing grid 15, e.g. by welding. The straps 80 are provided on their upper edges with mixing vanes 86 preferably formed integrally with the straps 80 and having preferably the same shape as the vanes of the spacer grid 14.

The intermediate mixing grid 15 comprises tubular inserts 84 each surrounding the intersection of two straps 80. The insert 84 is axially secured to the corresponding straps 80 by mechanical means or preferably by a spot weld 85 at least one and preferably at each intersection of its lower end with said straps 80.

Figure 15:
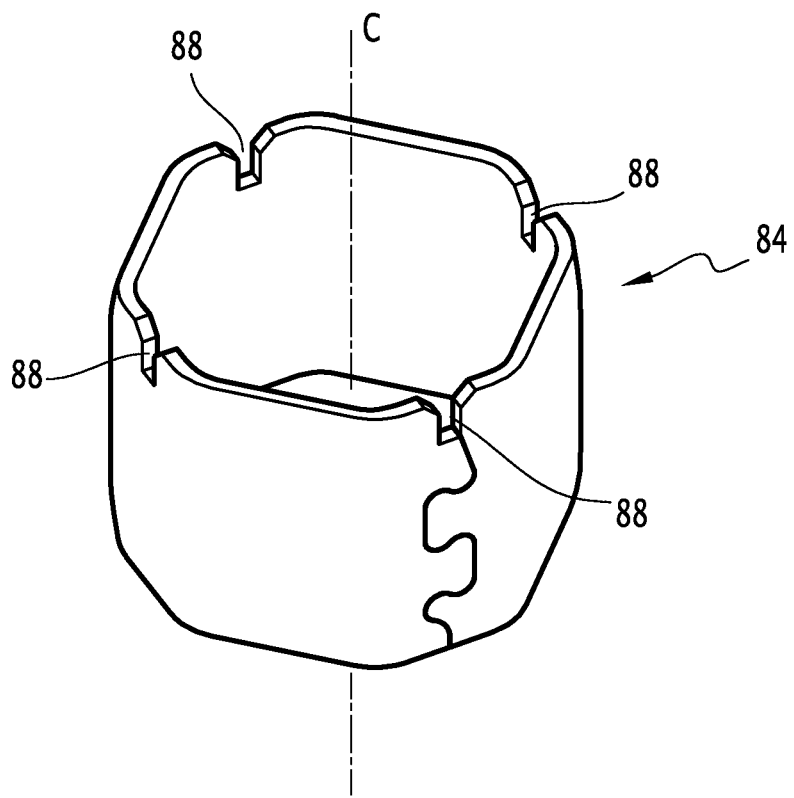
FIG. 15 is a perspective view of an insert of the intermediate mixing grid of FIG. 14.

As illustrated on FIG. 15, each insert 84 extends along an insert axis C. Each insert 84 has for example an octagonal cross-section in view along insert axis C. Each insert 84 is formed for example by rolling a metal sheet and mechanically interlocking complementary dovetail-like reliefs provided on opposed edges of the sheet and forming a mortice-tenon joint. The upper edge of the insert 84 is provided with insert notches 88. Both end portions of the insert 84 are slightly conical and converging towards the extremities of the insert 84 to prevent local contact and possibly fretting of the cladding of the fuel rods 4 against the edges of the insert 84.

Figure 16:
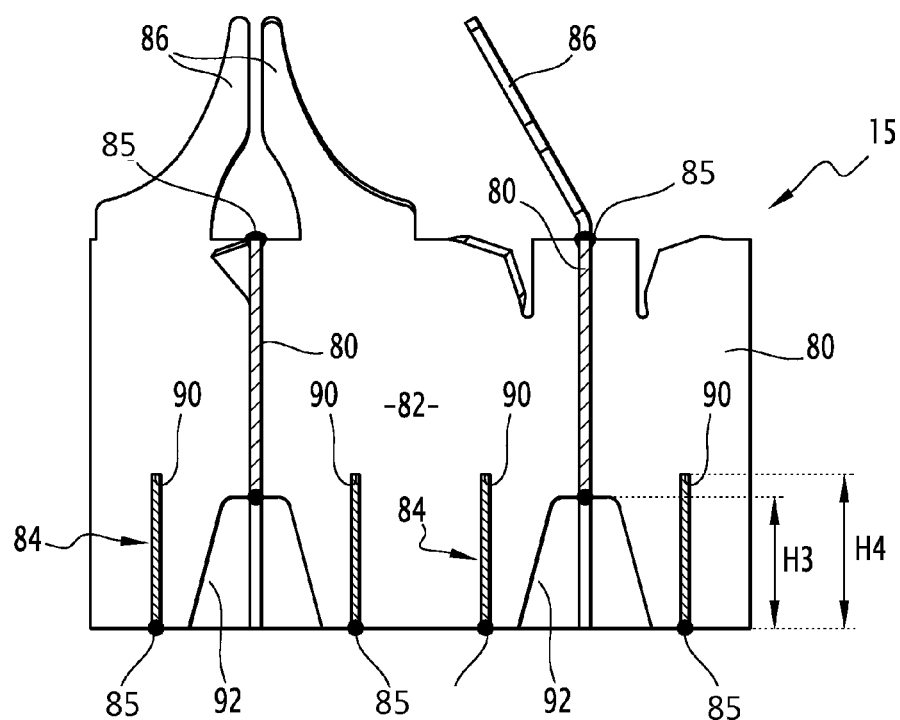
FIG. 16 is a cross-sectional view of the intermediate mixing grid along XVI-XVI on FIG. 14.

As illustrated on FIG. 16, each strap 80 has connection slots 90 for insertion of the inserts 84. The region of each strap 80 surrounded by an insert 84 is provided with a cutout 92 extending from the lower edge of the strap 80. The height H3 of the cutouts 92 is comprised between 50% and 100% of the height H4 of the connection slot 90. This embodiment provides the advantage of limiting pressure drop of the intermediate mixing grid 15 and of balancing pressure in the adjacent cells 82 separated by the straps 80.

The intermediate mixing grid 15 has a peripheral strap surrounding the inner interlacing straps 80 or is deprived of peripheral strap, in which case the peripheral cells 82 are opened outwardly.

As visible on FIG. 14, the inserts 84 are dimensioned to leave a gap G between each portion of an insert 84 extending into a cell 82 and the fuel rod 4 extending through said cell 82. The inserts 84 do not provide resilient lateral support to the fuel rods 4. They however act as motion limiter preventing contact between the fuel rods 4 and the mixing vanes 86.

The straps 80 of an intermediate mixing grid 15 have a short height as compared to the straps 18 of a spacer grid 14.

The height of a spacer grid 14, that is the height of the straps 18 taken between the lower edge 50 and the upper edge 70, is for example comprised between 30 mm and 45 mm.

An intermediate mixing grid 15 has for example a height of 15 mm. An insert 84 has for example a height of 6 mm. A cutout 92 has for example a height of 5 mm.

The use of the insert 84 leads to a very simple shape of the straps 80, flat in their interlaced part and very easy to assemble. In addition, the insert 84 being inserted from the lower edge into the intermediate mixing grid 15, there is no risk of interference between the mixing devices carried by the upper edge of the straps 80 and the insert 84 during the intermediate mixing grid assembling. The mixing device may be designed without restriction due to the geometry of the straps 80.

Having similar features for the spacer grids 14 and the intermediate mixing grids 15 provides the different grids 14, 15 of the fuel assembly 2 with homogeneous characteristics in terms of hydraulic flow, pressure loss and mechanical behaviour.

The invention is not limited to the described embodiments.

Hence, the described embodiments relate to a fuel assembly having a bundle of fuel rods arranged at the nodes of the square lattice. The fuel rods cells have a square outline. The invention also applies to other type of lattices, namely to hexagonal lattices such as the fuel assembly of the VVER type.

In the spacer grids and intermediate mixing grids, the straps and the inserts are preferably made of zirconium alloy. In an alternative embodiment the inserts are made of Ni-based alloy or of another material with high mechanical characteristics such as for instance Ph13.8 Mo.

In a general manner, at least one fuel assembly mixing or spacer grid comprises tubular inserts each surrounding one respective intersection of interlaced straps forming the grid.

Preferably, each mixing or spacer grid comprises tubular inserts each surrounding one respective intersection of interlaced straps forming the grid. In an alternative embodiment, at least one grid may be deprived of such inserts.

Preferably, each grid has straps and inserts in zirconium alloy. In an alternative embodiment, at least one grid may comprise insert which are not made of zirconium alloy.

Preferably each intermediate mixing or spacer grid, located between the lowermost grid and the uppermost grid of the fuel assembly, has mixing vanes. In an alternative embodiment, at least one intermediate grid is free of mixing vanes.

Preferably the uppermost grid and/or the lowermost grid of the fuel assembly is free of mixing vanes.

In one embodiment, the lowermost grid is of a different design and the uppermost grid is similar in conception to the lowermost grid or is similar in conception to the intermediate spacer grids.

What is claimed is:

1. A fuel rod support insert for connecting to interlaced straps of a nuclear fuel assembly spacer grid, the interlaced straps defining a lattice of cells for receiving fuel rods, the fuel rod support insert comprising:
   a first end portion and a second end portion, the first end portion and the second end portion configured for abutting the straps, the fuel rod support insert extending axially along an insert axis between first end portion and the second end portion, the fuel rod support insert being configured such that the insert axis is positioned parallel to a center axis of at least one of the cells when the fuel rod support insert is connected to the straps; and at least one spring extending axially with respect to the insert axis between the first and second end portions, the at least one spring being defined in part by at least one slot extending axially with respect to the insert axis, the at least one spring being configured for transversely abutting a fuel rod when the fuel rod support insert is connected to the straps, the fuel rod support insert being configured for extending in at least one of the cells when the fuel rod support insert is connected to the straps, the spring extending axially through planes perpendicular to the insert axis and radially away from the first end portion and the second end portion to define an apex configured for contacting the fuel rod when the fuel rod is inserted into one of the cells, the spring having a non-rectilinear cross-section in each of the planes perpendicular to the insert axis, wherein the spring comprises a contact wing and a lateral wing adjacent to each other and extending side-by-side along the insert axis, the contact wing and the lateral wing each including an inner surface facing the straps and an outer surface facing away from the straps, the outer surfaces of the contact wing and the lateral wing being inclined relative to each other, the contact wing being configured for contacting the fuel rod and the lateral wing extending laterally from the contact wing towards one of the straps.

2. The fuel rod support insert as recited in claim 1 wherein the outer surface of the lateral wing is flat.

3. The fuel rod support insert as recited in claim 1 wherein the outer surface of the contact is convex.

4. The fuel rod support insert as recited in claim 1 wherein the lateral wing extends along a length thereof between the first end portion and the second end portion axially with respect to the insert axis, the lateral wing extending along a width thereof between a first longitudinally extending edge and second longitudinally extending edge laterally with respect to the insert axis, the width of the lateral wing varying along the length thereof.

5. The fuel rod support insert as recited in claim 1 wherein the contact wing extends along a length thereof between the first end portion and the second end portion axially with respect to the insert axis, the contact wing extending along a width thereof between a first longitudinally extending edge and second longitudinally extending edge laterally with respect to the insert axis, the width of the contact wing substantially constant along the length thereof.

6. The fuel rod support insert as recited in claim 1 wherein the contact wing extends along a length thereof between the first end portion and the second end portion axially with respect to the insert axis, the contact wing being arched away from the insert axis along the length.

7. The fuel rod support insert as recited in claim 1 further comprising one contact wall, a first connection wall and a second connection wall, the first and second connection walls being connected by the contact wall, the at least one spring including a first spring and a second spring, the first spring being formed by the one contact wall and the first connection wall, the second spring being formed by the one contact wall and the second connection wall.

8. The fuel rod support insert as recited in claim 1 further comprising at least two walls extending longitudinally between the first end portion and the second end portion, the at least two walls inclined one relative to the other when viewed along the insert axis, the at least two walls including a contact wall and a first connection wall adjacent to the contact wall, the spring being at a junction between the contact wall and the adjacent connection wall with the contact wing formed by the contact wall and the lateral wing formed by the adjacent connection wall.

9. The fuel rod support insert as recited in claim 8 wherein the at least one spring includes a first spring and a second spring, the at least two walls including a second connection wall adjacent to the contact wall such that the contact walls is laterally between the first connection wall and the second connection wall with respect to the insert axis, the first spring having a first contact wing formed by the contact wall and first lateral wing formed by the first connection wall, the second spring having a second contact wing formed by the contact wall and a second lateral wing formed by the second connection wall.

10. The fuel rod support insert as recited in claim 1 wherein the insert is tubular and includes a plurality of walls defining a polygonal cross-section, the at least one spring including a pair of springs located at each corner of the polygonal cross-section.

11. The fuel rod support insert as recited in claim 1 wherein the at least one spring includes a pair of springs defined by three slots each having a length extending axially with respect to the insert axis, the three slots including one central slot and two lateral slots, the length of the one central slot being greater than the length of each of the two lateral slots.

12. The fuel rod support insert as recited in claim 11 wherein the central slot has a width decreasing from axial ends of the central slot towards a middle of the central slot.

13. A spacer grid for a nuclear fuel assembly, the spacer grid comprising:

interlaced straps defining a lattice of cells for receiving fuel rods; and support inserts provided at intersections of the straps for supporting the fuel rods which extend through the cells, the support inserts each comprising:

a first end portion and a second end portion, the first end portion and the second end portion configured for abutting the straps, the fuel rod support insert extending axially along an insert axis between first end portion and the second end portion, the fuel rod support insert being configured such that the insert axis is positioned parallel to a center axis of at least one of the cells when the fuel rod support insert is connected to the straps; and at least one spring extending axially with respect to the insert axis between the first and second end portions, the at least one spring being defined in part by at least one slot extending axially with respect to the insert axis, the at least one spring being configured for transversely abutting a fuel rod when the fuel rod support insert is connected to the straps, the fuel rod support insert being configured for extending in at least one of the cells when the fuel rod support insert is connected to the straps, the spring extending axially through planes perpendicular to the insert axis and radially away from the first end portion and the second end portion to define an apex configured for contacting the fuel rod when the fuel rod is inserted into one of the cells, the spring having a non-rectilinear cross-section in each of the planes perpendicular to the insert axis, wherein the spring comprises a contact wing and a lateral wing adjacent to each other and extending side-by-side along the insert axis, the contact wing and the lateral wing each including an inner surface facing the straps and an outer surface facing away from the straps, the outer surfaces of the contact wing and the lateral wing being inclined relative to each other, the contact wing being configured for contacting the fuel rod and the lateral wing extending laterally from the contact wing towards one of the straps.

14. The spacer grid as recited in claim 13 wherein connection walls of each of the support inserts are inserted in connection slots provided on lower edges of the interlaced straps.

15. The spacer grid as recited in claim 13 wherein each of the inserts is secured to the straps by spot-welds.

16. A nuclear fuel assembly comprising:
   a bundle of fuel rods; and
   an armature for supporting the fuel rods, the armature comprising at least one spacer grid for a nuclear fuel assembly, the spacer grid comprising:
      interlaced straps defining a lattice of cells for receiving fuel rods; and
      support inserts provided at intersections of the straps for supporting the fuel rods which extend through the cells, the support inserts each comprising:
         a first end portion and a second end portion, the first end portion and the second end portion configured for abutting the straps, the fuel rod support insert extending axially along an insert axis between first end portion and the second end portion, the fuel rod support insert being configured such that the insert axis is positioned parallel to a center axis of at least one of the cells when the fuel rod support insert is connected to the straps; and
         at least one spring extending axially with respect to the insert axis between the first and second end portions, the at least one spring being defined in part by at least one slot extending axially with respect to the insert axis, the at least one spring being configured for transversely abutting a fuel rod when the fuel rod support insert is connected to the straps, the fuel rod support insert being configured for extending in at least one of the cells when the fuel rod support insert is connected to the straps, the spring extending axially through planes perpendicular to the insert axis and radially away from the first end portion and the second end portion to define an apex configured for contacting the fuel rod when the fuel rod is inserted into one of the cells, the spring having a non-rectilinear cross-section in each of the planes perpendicular to the insert axis,
      wherein the spring comprises a contact wing and a lateral wing adjacent to each other and extending side-by-side along the insert axis, the contact wing and the lateral wing each including an inner surface facing the straps and an outer surface facing away from the straps, the outer surfaces of the contact wing and the lateral wing being inclined relative to each other, the contact wing being configured for contacting the fuel rod and the lateral wing extending laterally from the contact wing towards one of the straps.

17. The nuclear fuel assembly as recited in claim 16 further comprising at least one intermediate mixing grid comprising interlaced straps provided with mixing vanes and defining a lattice of cells for receiving the fuel rods, the support inserts being tubular and each being provided around the intersection of two of the straps of the mixing grid for preventing contact between the fuel rods extending through the cells and the mixing vanes.

18. The nuclear fuel assembly as recited in claim 17 wherein the support inserts are secured to the straps of the mixing grid by at least one spot weld.

\* \* \* \* \*